Jan. 22, 1957     W. E. KNAPP ET AL     2,778,548
PLANTER VALVE
Filed Oct. 16, 1953
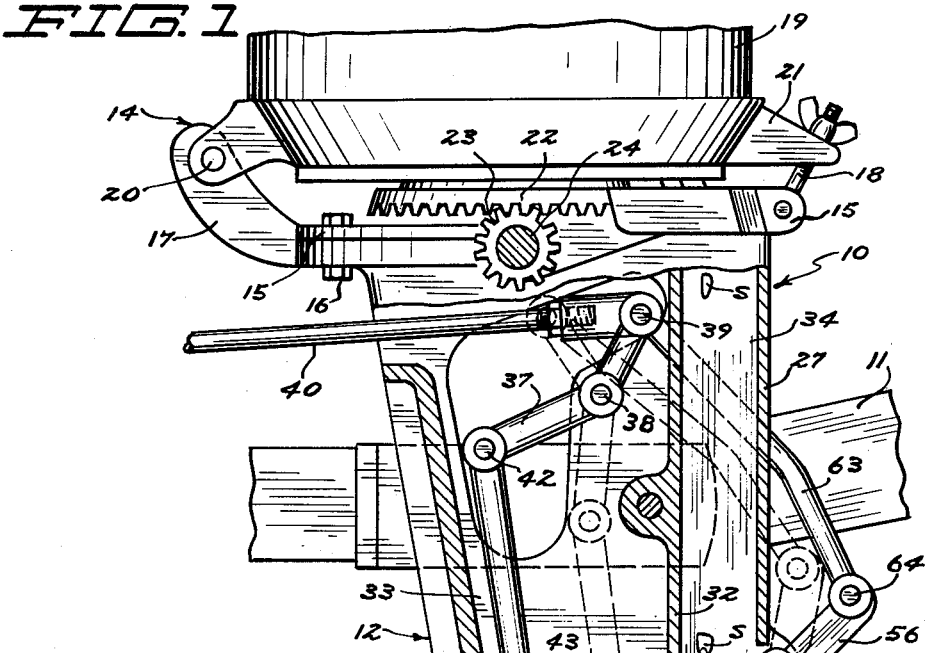
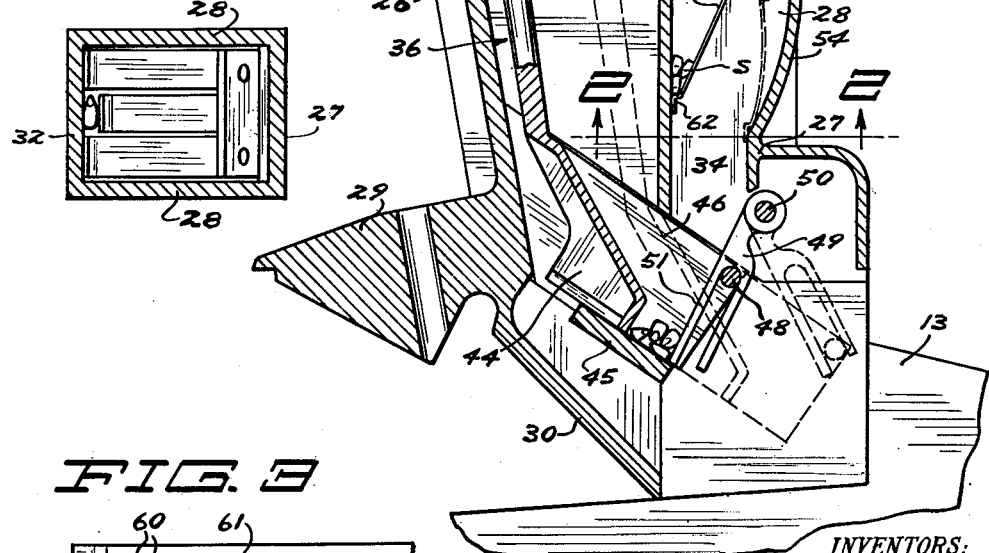
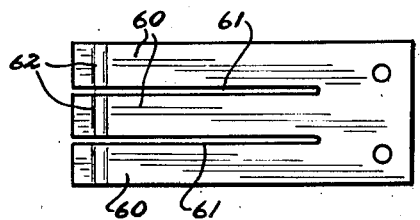
INVENTORS:
WILLIAM E. KNAPP
ROBERT R. ROTH
BY Carlsen & Hazle
ATTORNEYS

United States Patent Office 2,778,548
Patented Jan. 22, 1957

2,778,548
PLANTER VALVE

William E. Knapp, Moline, and Robert R. Roth, Rock Island, Ill., assignors to Minneapolis-Moline Company, Hopkins, Minn., a corporation of Minnesota Application October 16, 1953, Serial No. 386,438

6 Claims. (Cl. 222—556)

This invention relates generally to crop planters and more particularly to planters of the hill drop type and the valve means used therein for dropping the seed in hills of predetermined size.

The primary object of the invention is to provide an improved valve construction for hill drop planters which will allow increased speed in planting by increasing the number of hills which can be planted per minute.

Another object of the invention is to provide an improved planter valve which will not crush or otherwise damage seed caught in the valve as it is closed.

Still another object of the invention is to provide a planter valve which will not be held in open position allowing untimely passage of seeds therethrough even though a seed be caught between the relatively opening and closing valve members.

With these and still additional objects in view, our invention broadly comprises a seed tube adapted to be positioned under the seed hopper to extend downwardly and provide a passageway for the seed being discharged from the hopper, a lower valve near the bottom end of the spout for catching the seed and discharging it to the soil in the desired quantity, and an upper valve within the seed tube intermediate the hopper and lower valve, but nearer to the latter than the former, for temporarily catching the seeds as they fall from the hopper one by one and then discharging them to the lower valve when the desired hill number of seeds has been accumulated therein, the upper valve including a flat spring member having one end engageable with a wall of the tube to close the valve and the said spring member being slit adjacent said end to provide a row of resilient fingers adapted to bear against the wall.

The above mentioned and still additional objectives of the invention will be brought to light during the course of the following specification, reference being made to the accompanying drawing, in which—

Fig. 1 is a side elevation of the planter with the seed spout or tube shown in longitudinal vertical section in order that the valve construction might be clearly understood. Both valves are shown in closed position in full lines and in open position in broken lines.

Fig. 2 is a longitudinal horizontal section taken along the line 2—2 of Fig. 1 showing the condition of the valve when a seed has been caught therein during the valve closing.

Fig. 3 is a plan view of our novel valve closure member.

In the drawings we have only shown the planter portions with which our invention is concerned, it being understood that the frame, wheels, checkheads, controls, and other elements of the planter assembly may be of conventional construction.

Referring now more particularly to the drawing, reference numerals will be used to denote like parts or structural features in the different views. The planter unit is designated generally by the numeral 10 and is mounted upon a wheeled planter frame, a section of which is shown at 11. In normal planter construction two or more of the units 10 are mounted in transverse alignment for travel behind or at the sides of a tractor or other draft vehicle.

Each unit 10 comprises generally a vertically disposed planter shank 12 mounted on the frame and having a runner 13 rigidly fixed to its lower end and a seed dispensing mechanism 14 supported upon its upper end. The seed dispensing mechanism 14 is of conventional construction and is not shown and will not be described in great detail. Generally, there is a support 15 mounted on the shank, as at 16, and having an upwardly projecting ear 17 at its forward end and a locking bolt 18 at its rear end. A seed can or hopper 19 is hinged to the ear 17, as at 20, and has a rearwardly projecting latch 21 for receiving the bolt 18 to lock the can against upward movement about the pivot 20.

Seed and cut-off plates, neither of which are shown, are disposed within the hopper bottom the former being operatively connected to the gear ring 22 for rotation about a vertical axis. Ring 22 meshes with a pinion 23 keyed to seed shaft 24 which may be driven through connection with the planter press wheels or in any other suitable manner. It will accordingly be understood that as shaft 24 is driven the seed plate will be rotated in such a manner as to discharge seeds S continuously from the rear portion of the hopper bottom as shown in Fig. 1.

The shank 12 of the planter unit has a front wall 26, a rear wall 27 and side walls 28 which combine to form a generally vertically extending passageway from the mechanism 14 to the runner 13. The wall 26 has an integrally formed enlarged mounting block 29 near its lower end to which is secured the side plates of the runner 13. The wall then terminates in a downwardly and rearwardly inclined shield 30 which lies between the sides of the runner to shield the lower portions of the planter valve mechanism, to be described, from the soil and the like through which the runner travels. There is a transverse wall 32 connecting the side plates 28 and extending from the mechanism 14 downwardly as shown to separate the interior of the shank into two independent vertically extending passageways 33 and 34. The more forward of these passageways, denoted at 33, serves as a compartment for the operating mechanism of the lower seed valve. The other passageway 34 serves as a seed tube through which the seeds S travel from the seed dispensing mechanism 14 to the ground.

The lower valve structure denoted generally at 36 will now be described. A bell crank 37 is mounted on shaft 38 for oscillating movement within the compartment 33 on a transverse axis. One arm of the crank is journaled on transverse shaft 39 which is fixed to the rear end of a pull rod 40 extending forwardly for connection to the check shaft of the planter. The other arm of the member 37 is pivotally connected, as at 42, to the upper end of the valve member 43. A pusher shoe 44 is formed at the lower end of the valve member 43 and this shoe has a flat bottom surface adapted to slide flush along the top surface of the catch plate 45 mounted diagonally between the side walls 28 of the compartment 33. Plate 45 is disposed to incline downwardly and rearwardly as shown extending slightly under the wall 32 and spaced a short distance from the lower end thereof. The shoe portion 44 of the member 43 has side walls 46 which project in transversely spaced parallelism from the shoe downwardly and rearwardly under the wall 32. These side walls move flush along the side walls 28 and carry between them at their rear upper corners a gate valve pin 48. A gate or flap valve 49 is pivoted to shank 12 as by pin 50 and is forked at its extended end to straddle pin 48. The forwardmost leg 51 of the gate valve 49 extends downwardly to the plate 45 and transversely to cover the space but fit loosely between the walls 46 so that the valve, side walls 46 and plate 45 jointly form an upwardly opening pocket beneath the seed tube 34.

The operation of the lower planter valve will now be clearly understood. As the planter check wire or automatic hill drop attachment actuates the pull rod 40 forwardly the bell crank 37 is swung about the shaft 38 moving valve 43 downwardly within its housing. With this movement shoe 44 slides downwardly along plate 45 with pin 48 swinging the gate valve 49 about its pivot to an open position allowing seeds lying on plate 45 to fall to the ground. The valve shoe 44 passing over the plate insures positive simultaneous ejection of all the seeds resting in the pocket. Accordingly, lower valve 36 functions to eject from the planter seeds S in groups of seeds which have accumulated therein so as to form hills in spaced intervals in the desired manner. Of course, the check shaft causes the rod 40 to reciprocate quickly so that the valve opens only momentarily.

Inasmuch as in normal operation the valve mechanism 36 operates very rapidly and, further, inasmuch as the seed mechanism 14 continuously discharges the seeds singly the gate valve does not remain closed a sufficient period to accumulate a hill of seeds should they be dropped directly from the hopper to the valve. The seeds must accordingly be dropped to the lower valve as a group during the brief period that it is closed. The accumulation of the seed group is accomplished by the upper valve, denoted generally at 53, and to be now described.

The lower central portion of the seed tube 34 is enlarged slightly by forming the portion of wall 27 denoted at 54 to bulge outwardly as shown. Walls 28 are extended at this area to reach and connect with the wall portion 54. An opening 55 is provided in the wall 27 at the upper end of wall portion 54 and a valve actuating lever 56 is pivoted on pin 57, held between walls 28, for limited movement on a transverse axis. A gate valve 58 is fixed as by rivets 59 to the lever 56 and extends downwardly and forwardly across the seed tube with its distal edge bearing against the wall 32.

The valve 58 is of flat spring steel or similar resilient material. As best shown in Fig. 3, the valve is split into equal segments or fingers 60 by deep slots 61 extending inwardly from the free end. There is a slight hook 62 formed at the ends of the fingers to insure a firm engagement of the valve 58 against wall 32. Link 63 has its upper end journaled on shaft 39 to move with crank 37 about the shaft 38 and its lower end is pivoted as at 64 to the valve actuating lever 56. Accordingly when rod 40 is pulled forwardly to open the valve mechanism 36, link 63 operates to swing the member 56 upwardly opening valve 58 to the position shown in broken lines.

In normal operation of the planter as it is moved over the ground the seed plate at the bottom of hopper 19 is driven continuously through shaft 24 to dispense single seeds into the tube 34. The seeds are caught in the V-shaped pocket formed by valve 58 and wall 32. The check wire or automatic hill drop attachment is set to trip the check shaft to pull rod 40 and open the valves when a hill of desired size has accumulated in the upper valve. With simultaneous opening of both valves the seeds in the lower valve are discharged as a hill to the ground and the seeds in the upper valve are released to fall as a group to the lower valve.

Rod 40 moves forward and then is returned rearwardly by the tripping of the check shaft with such speed that the valves are open only momentarily or long enough to discharge the seeds which they carry. Accordingly, while the seed falling from the upper valve has only a very short distance of descent the gate 51 of the lower valve is closed before the seeds reach the lower valve. The modified V-shape of the upper valve insures an immediate falling away of the seed from the opening valve.

It will also be noted that the bottoms of the pockets in each valve are in vertical alignment so that the seed drops directly from the pocket of the upper valve to the pocket of the lower valve, the tube being free of obstructions therebetween. This feature also insures a rapid drop with no frictional resistance on the seeds.

With seeds S dropping in a continuous stream from the seed mechanism through tube 34 it is virtually impossible for the valve 58 to be opened and closed without occasionally catching a seed between the movable member of the valve and the element against which it closes. In valving heretofore known, when a seed is so caught in the valve, that is, wedged between the valve members, the members are held in a separated condition so as to allow other seeds to dribble past the valve and on to the lower valve without interception by the upper valve. This, of course, results in the distribution of hills of unequal size by the planter. We have overcome this problem by the split construction of valve 58. It will be understood from observation of Fig. 2 that, should a seed S be caught between one portion of valve 58 and the wall 32, only one finger 60 will be deflected the other fingers 60 of the valve still closing tightly against the wall prohibiting passage of other seeds. The resilient character of valve member 58 is also of great importance in that if a seed is caught by the valve closing it will not be crushed or otherwise damaged.

In the upper valve construction the relatively immovable wall 32 of the seed tube is, at the area adjacent contact with the member 58, actually a part of the valve. It would accordingly be possible to construct the valve with this section of the wall 32 as the spring metal members with the movable gate 58 rigid. However, the shown construction is preferred as the lighter weight of the spring reduces the inertia of the valving.

As hereinbefore stated, an objective of the present invention is to provide a planter which may be used at increased speed while yet accurately depositing seed hills of the desired size. In the majority of the planters in present day use the upper valve is located immediately under the seed plate or at a distance of fifteen or more inches above the lower valve. It will be understood that the seed must drop from the upper to the lower valve while the planter is traveling the distance between hills, normally forty inches. Accordingly, with the above mentioned fifteen-inch spacing, the theoretical maximum planting rate is about 215 hills per minute as it takes the seed about 0.278 seconds to drop fifteen inches. This does not allow for delay in dropping of the seed from the upper valve after it starts to open nor any time for settling of the seed in the lower valve before it starts to open and in actual working conditions it is found that the maximum rate of accurate planting where fifteen inch valve spacing is used is about 110 hills per minute.

In our construction we have reduced the valve spacing to about four inches. The seed will drop this distance in approximately .144 second resulting in a theoretical maximum planting rate of 417 hills per minute. In field usage the planting rate is, of course, lower than this but experiments show that accurate planting can be effected at a much higher rate than where the valves are spaced the greater distance apart. It is the design of the upper valve in such a manner as to prohibit cracking and dribbling past when a seed is caught that allows the closer valve spacing and resultant speedier planting.

Still another important feature of our improved planter valve arrangement and structure lies in its ready adaptability for use of the planter for drilling purposes. The valving is designed to give a "clean" seed tube with minimum obstructions when the planter is so used. For drilling the preferred arrangement is to partially open both valves to positions intermediate their fully closed and fully open positions. The bell crank 37 is so adjusted as to lock both valves in approximately a three-quarters open position. This brings valve member 58 and the leg 51 of the member 49 into substantial alignment with the rear wall 27 and the shoe 44 projects only slightly under the seed tube passage 34 leaving a clear unobstructed passageway through which the seed may drop to the soil.

We have accordingly provided a planter valve construction which economically and effectively carries out the aforementioned objectives. It is understood that suitable modifications may be made in the structure as disclosed, provided that such modifications come within the spirit and scope of the appended claims. Having now therefore fully illustrated and described our invention, what we claim to be new and desire to protect by Letters Patent is:

1. A valve for speed planters comprising a vertical seed tube, a valve member pivotally mounted within the tube, control means on the valve member for moving the member about its pivot between positions opening and closing the tube, and said member including a closure gate formed of a single plate of resilient metal which is longitudinally slotted along one edge to provide a plurality of parallel horizontally spaced resilient fingers adapted to bear endwise against a wall of the tube when the member is in closing position.

2. A valve for a planter having a seed discharge spout presenting an elongated generally vertical passageway comprising a lever member pivotally associated with one wall of the spout for movement about an axis generally perpendicular to the passageway, and a flat gate member having one end fixed to the lever member for movement therewith between a position extending across the passageway to the opposing wall of the spout to close the passageway and a position extending generally parallel to the passageway to open the same, said gate member having a plurality of resilient fingers at its distal end adapted to bear against said opposing wall in substantially horizontal alignment when said member is in passage closing position.

3. A valve for opening and closing the passage through a planter seed discharge tube which comprises an actuator member pivoted to the tube adjacent one wall thereof for movement about an axis generally perpendicular to the tube, and an elongated valve gate having one end fixed to the actuator member and extending diagonally downward across the passage to the opposing wall of the tube to bear thereagainst, said gate having a plurality of longitudinal slits extending from its distal end and being spaced across the gate, and said gate being formed of spring metal.

4. In a planter, a valve for opening and closing the passage through an upright seed discharge tube having a flat wall area, which comprises an elongated longitudinally resilient valve member disposed within the passage and arranged diagonally within the passage with its lower edge in engagement with the said wall area to form an upwardly opening pocket within the passage for the reception of seed, the upper end portion of the valve member pivotally associated with the tube for movement of said lower edge away from said area to release the seed, a control on the valve member for operation thereof about the pivot, and said valve member comprising a plate of resilient metal having its lower end portion longitudinally slotted to form a plurality of independent resilient fingers.

5. A valve for opening and closing the passage through a planter seed discharge tube which comprises an actuator member pivoted to the tube adjacent one wall thereof for movement about an axis generally perpendicular to the tube, and an elongated valve gate having one end fixed to the actuator member and extending diagonally downward across the passage to the opposing wall of the tube to bear thereagainst, said gate having a plurality of longitudinal slits extending from its distal end and being spaced across the gate, and said gate comprising a generally flat spring member arranged to form an upwardly opening V-shaped pocket with a wall of the seed tube when in tube closing position.

6. A valve for a planter having a seed discharge spout presenting an elongated generally vertical passageway which comprises an actuator member pivoted to the tube adjacent one wall thereof for movement about an axis generally perpendicular to the tube, a flat valve gate having one edge fixed to the actuator member and extending diagonally downward across the passageway to the opposing wall of the tube with the distal edge of the gate having a generally horizontal line of contact with said opposing wall, and said gate being of a single piece of resilient material which is transversely flexible along said distal edge.

References Cited in the file of this patent

UNITED STATES PATENTS

| | | |
|---|---|---|
| 954,850 | Burke | Apr. 12, 1910 |
| 1,482,513 | Gredell | Feb. 5, 1924 |
| 1,680,570 | Ripley | Aug. 14, 1928 |
| 1,951,458 | White | Mar. 20, 1934 |
| 2,390,969 | Traphagen | Dec. 11, 1945 |